May 25, 1926.
A. MASTER
CLUTCH
Filed March 21, 1921  2 Sheets-Sheet 1
1,585,906
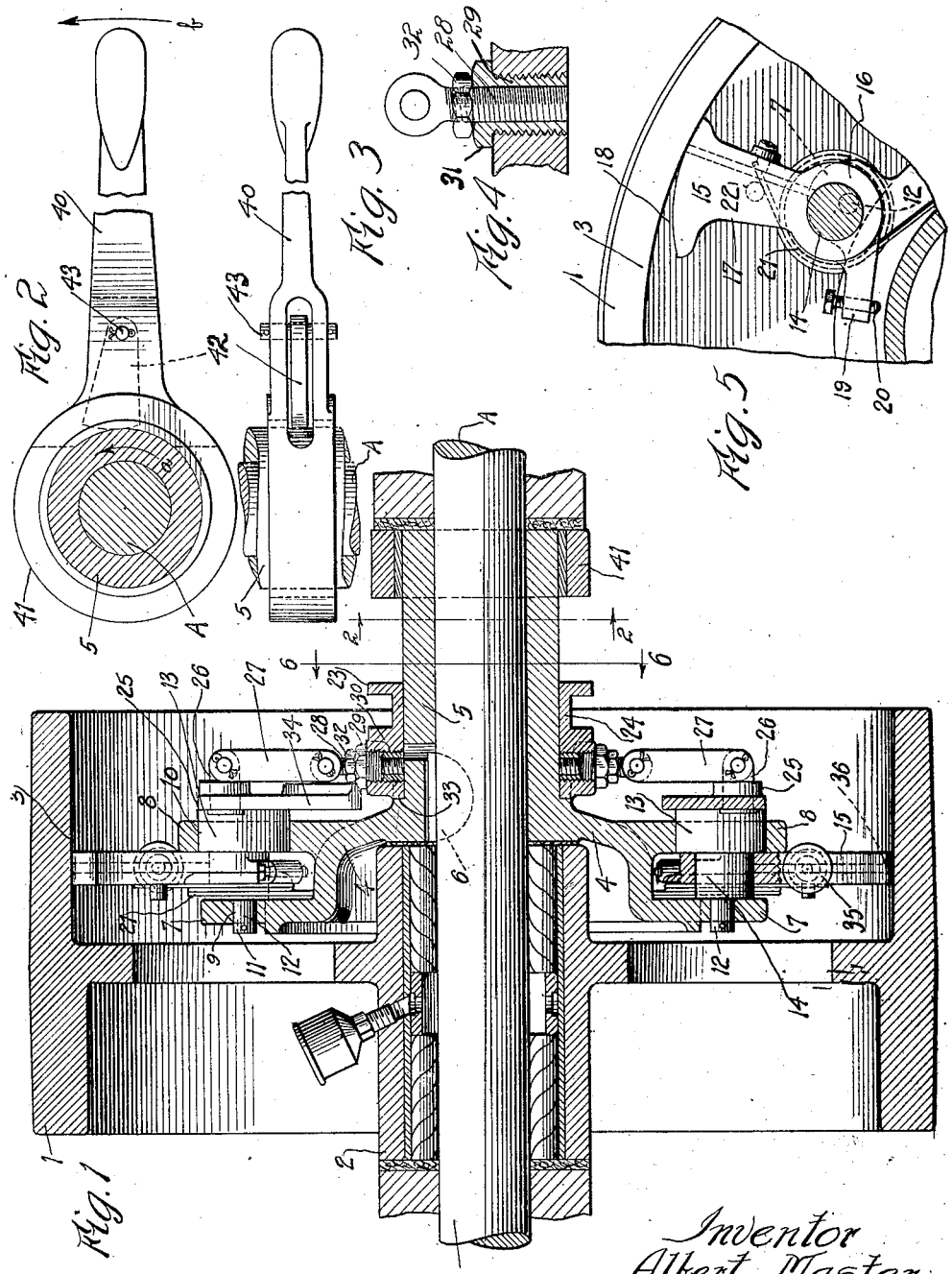
Inventor
Albert Master
By Miller, Chindahl & Parker
Attys May 25, 1926.
A. MASTER
CLUTCH
Filed March 21, 1921
1,585,906
2 Sheets-Sheet 2
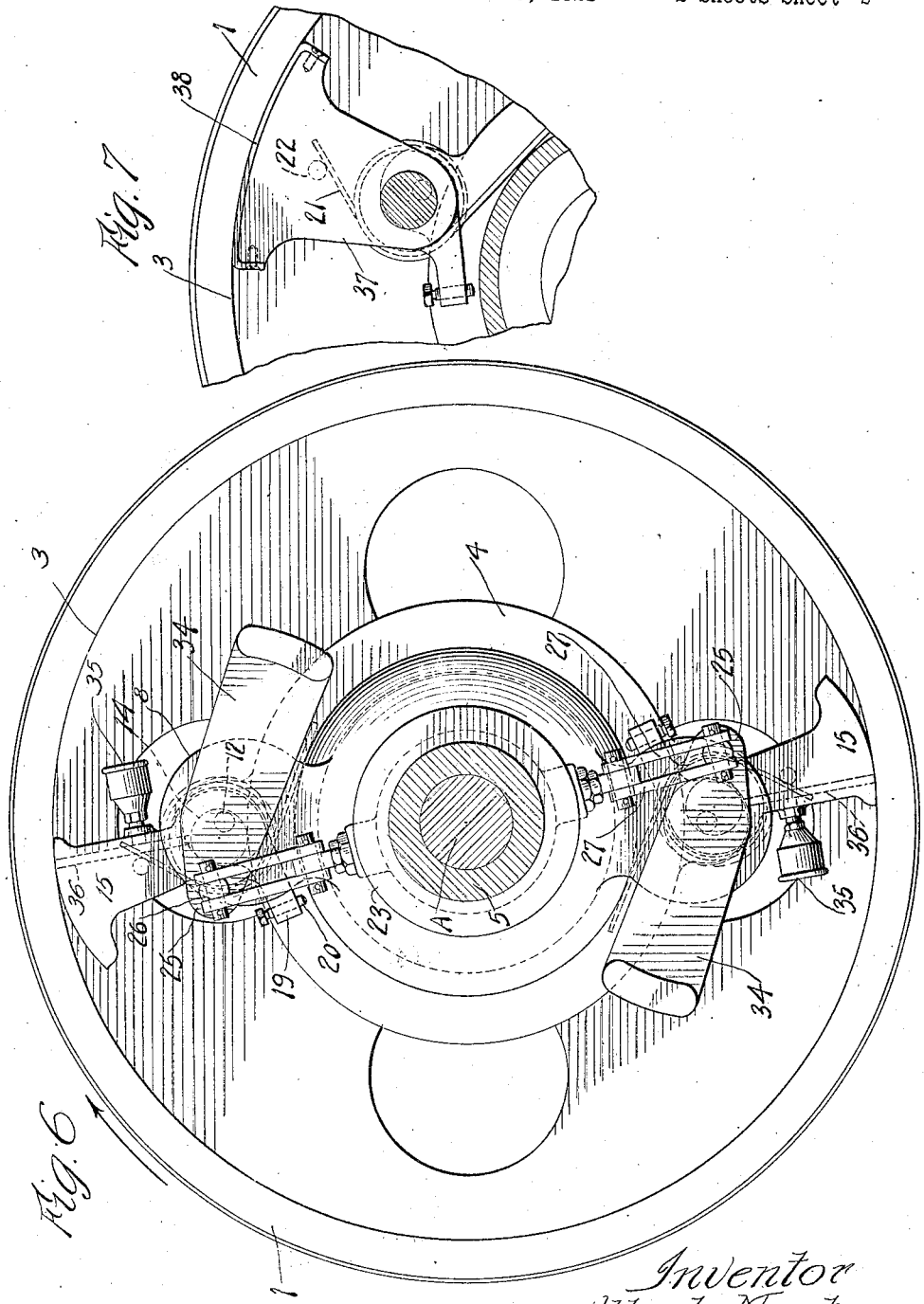
Inventor
Albert Master
By Miller Chindahl + Parker
Attys Patented May 25, 1926.

1,585,906

UNITED STATES PATENT OFFICE.

ALBERT MASTER, OF PARK RIDGE, ILLINOIS.

CLUTCH.

Application filed March 21, 1921. Serial No. 453,865.

The object of this invention, generally stated, is to provide a clutch in which lost motion shall be reduced to a minimum, which shall be simple in construction, inexpensive to manufacture, capable of being adjusted to take up wear and looseness in the parts, and adapted to be easily thrown into and out of operation while the driving element is being rotated.

In the accompanying drawings, Figure 1 is a transverse sectional view through a clutch embodying the features of my invention. Fig. 2 is a view taken in the plane of line 2—2 of Fig. 1 showing a test lever. Fig. 3 is another view of said lever. Fig. 4 is an enlarged detail view of an adjusting means. Fig. 5 is a fragmentary view illustrating one of the clutching elements. Fig. 6 is a view taken in the plane of line 6—6 of Fig. 1. Fig. 7 illustrates an alternative construction.

The embodiment which has been selected for illustration herein comprises a fly wheel pulley 1 adapted to receive a drive belt (not shown). Said pulley is provided with a hub 2 rotatably mounted upon a shaft A in any suitable manner. The inner periphery 3 of the pulley 1 is finished and serves as a clutch driving surface.

The driven element of the clutch comprises a suitable number of clutch members adapted to engage the surface 3, two clutch members being herein shown. The clutch members referred to are mounted upon a spider 4 having a hub or sleeve 5 mounted on the shaft A. The sleeve 5 is rigidly secured to the shaft A in any suitable manner, as, for example, by means of a key 6. Upon the spider 4 are formed two pairs of lugs 7 and 8 having alined openings 9 and 10 extending parallel to the axis of rotation of the spider. Said openings constitute bearings for a shaft 11 having a portion 12 adapted to be mounted in the bearing opening 9 and a portion 13 adapted to fit within the bearing opening 10, the portions 12 and 13 being axially alined. Between the shaft portions 12 and 13 is an eccentric portion 14. The bearing opening 10 is made large enough to allow the passage of the eccentric 14 when the shaft 11 is inserted into the bearings 9 and 10. On the eccentric 14 is pivotally mounted a clutch member 15. Such clutch member comprises a hub 16 (Fig. 5) mounted upon the eccentric 14, an outwardly extending arm 17 having a clutch surface 18 eccentric with respect to the hub 16 or the eccentric 14, and an arm 19 carrying a stop screw 20 adapted to bear upon the spider 4 when the clutch is thrown out. The eccentricity of the surface 18 is preferably slight so that a binding or wedging action occurs between it and the surface 3 in operation. I provide suitable means tending to turn the clutch member 15 upon the eccentric portion 14, which means may be of any suitable character. That herein shown consists of a torsion spring 21 surrounding the hub 16, one end of the spring bearing against a stud 22 on the arm 17 and the other end bearing against the spider 4. Said spring tends to turn the clutch member 15 in the direction to press the stop screw 20 against the spider.

While any suitable means may be employed to turn the shaft 11 to place the clutch member 15 in or out of contact with the surface 3 of the drive pulley, the means herein shown comprises a collar 23 slidably mounted upon the sleeve 5, and having a peripheral groove 24 to receive an ordinary operating yoke or fork (not shown). Rigid with the shaft 11 is an arm 25 in which is pivotally mounted a stud 26. Pivoted to the stud 26 is a double link 27. The link 27 is pivoted to a screw 28 having a right-hand thread. The screw 28 has a screw-thread connection with an adjusting sleeve nut 29. Said sleeve nut has an internal right-hand thread for engagement by the screw 28, and an exterior left-hand thread to engage the walls of a correspondingly threaded opening 30 in the collar 23. The adjusting sleeve nut 29 has a polygonal flange 31 to receive a wrench. 32 is a lock nut on the screw 28. It will be seen that when the sleeve nut 29 is rotated in the direction to move said nut outwardly, the screw 28 by reason of its opposite thread will also be moved outwardly with relation to the sleeve nut, thus obtaining an increased amount of adjustment. The adjusting means just described is well adapted for the intended purpose as it is simple and provides for a considerable range of adjustment while occupying but little space, but other adjusting means may be employed if desired.

The throwing-in movement of the collar 23 is limited by contact of said collar with an annular shoulder 33 on the spider 4. When the collar 23 is in contact with said shoulder, the link 27 is on dead center, that is to say, the points of pivotal connection of said link with the stud 26 and the screw 28 are in a plane perpendicular to the axis of the shaft A. It will be evident that the screw 28 and the adjusting sleeve nut 29 may be adjusted to take up all wear and looseness of parts, so that when the link 27 is on dead center, the clutch member 15 is in contact with the driving surface 3. It will be understood that the pressure between the surfaces 3 and 18 will cause the clutch member 15 to turn slightly upon the eccentric 14 until the eccentric surface 18 has rolled into unyielding contact with the surface 3.

When the collar 23 is slid to the right (Fig. 1) the shaft 11 is caused to turn in the direction to swing the eccentric 14 away from the surface 3 sufficiently to make ample clearance at all times between the clutch member 15 and the finished surface 3 no matter what position the clutch member 15 may take on the eccentric 14. The spring 21 serves to swing the clutch member 15 on the eccentric 14 until the stop screw 20 engages the spider 4. To assist in thus throwing out the clutch member 15 against the action of centrifugal force, I may provide the shaft 11 with an arm 34 that serves as a counterweight to overcome such force.

Any suitable lubricating means may be provided. Herein is shown a grease cup 35 attached to the clutch member 15 and communicating with a duct 36 extending through said clutch member from the bearing opening in the hub 16 to the eccentric surface 18.

In Fig. 7 I have shown another form of clutch member which may be employed. The clutch member 37 shown in said figure has a surface concentric with the flange 1 of the pulley provided with friction material 38 adapted to make contact with the driving surface 3 on the flange. The means for moving the friction surface 38 into and out of engagement with the driving surface 3 may be similar to that described in connection with the clutch member 15.

The clutch pulley being loosely mounted on the shaft, good practice demands a wide bearing on the shaft. This may be obtained, while yet keeping the over-all dimensions of the clutch at a minimum, by providing the spider 4 with a cup-shaped form and extending the hub 2 axially to lie within the cup-shaped spider. By this construction, the clutch elements 15' engage the pulley inside the annular space between the hub and the pulley rim. In the particular embodiment illustrated the hub is terminated within the plane of the edge of the pulley rim, leaving a space permitting the spider to be secured to the shaft in such a position that the spider lies wholly within the pulley rim, thus securing a compact construction.

While the clutch herein shown is well adapted for use in connection with various classes of machinery, it is herein disclosed in connection with the driving shaft A of a machine for "burning-in" and "running-in" the crank shafts of internal combustion engines. In the process of burning in a crank shaft, the crank shaft bearings are tightened until the crank shaft can with difficulty be rotated. The clutch construction illustrated in Fig. 6 is especially adapted to prevent the slippage which occurs in friction clutches when the clutch is suddenly subjected to a heavy load, while still enabling the operator to throw the clutch in and out with ease during the rotation of the pulley 1.

It is desirable to provide means whereby after the running in operation has continued for a time the operator may determine whether or not the crank shaft has been properly run in. I therefore provide a test lever 40 having a hub 41 which is rotatably mounted upon the sleeve 5, said lever carrying a dog 42 which is pivoted to the lever 40 at 43, and has an eccentric surface which lies in contact with the sleeve 5. While the shaft A is being rotated by the clutch, the lever 40 rests upon a suitable support, the sleeve 5 rotating past the dog 42 in the direction shown by the arrow $a$ in Fig. 2. When the workman desires to test the crank shaft, he throws out the clutch and oscillates the lever 40 through an arc of convenient length. When the lever 40 is swung in the direction indicated by the arrow $b$ in Fig. 2, the eccentric dog 42 engages the sleeve 5 and thereby turns the shaft A and the crank shaft connected therewith. It may be here noted that the hub of the test lever 40 serves to limit the throwing-out movement of the shift collar 23.

It will be apparent that the construction herein shown is well adapted to attain the desired ends. The adjusting means 28, 29 may be adjusted so that the collar 23 may be very easily slid into operative position to cause the clutch members 15 to engage the drive pulley without slippage. The parts are so designed that a minimum amount of machining is required for their manufacture and with a view to ease in assembling. Any looseness due to wear or to methods of manufacture may be taken up by adjustment of the sleeve nut 29 and the screw 28.

The form of clutch shown in Figs. 1 to 6 is adapted for one-way drive, while that illustrated in Fig. 7 is adapted for drive in either direction.

It will be observed that I have provided two eccentric elements (namely the parts 14 and 15), one of which is mounted on the other, together with means for turning one of said elements to place the other in operative position.

The foregoing detailed description has been given for the purpose of imparting an understanding of the present embodiment of the invention and not with the intention of limiting the invention to the construction and arrangement of parts herein disclosed, since various changes may be made without departing from the spirit of the invention as set forth in the appended claims.

I claim as my invention:

1. A positive-drive clutch having, in combination, a driving element and a driven element, said driven element comprising a spider having a supporting sleeve, said spider also having a pair of lugs having alined bearing openings, a shaft having two concentric portions journaled in said bearing openings and an intermediate eccentric, one of said bearing openings being large enough to allow passage of the eccentric in assembling, a clutch member having a hub pivotally mounted on the eccentric and an eccentric surface adapted to be engaged by the driving element, said clutch member also having an arm carrying a stop screw adapted to engage the spider, a torsion spring surrounding the hub of the clutch member and arranged to exert a tendency to turn the clutch member on the eccentric in the direction to place the stop screw in contact with the spider, an arm rigid with said shaft, a stud pivotally mounted in said arm, a shifting collar mounted upon and slidable longitudinally of said sleeve, an adjustable member on the collar, a link pivotally connected to said member and said stud, a counterweight arm also connected to said shaft, and means to limit movement of said collar in one direction when said link is on dead center.

2. A clutch having, in combination, a driving element and a driven element, said driven element comprising a spider having a supporting sleeve, a shaft journaled in said spider and having an eccentric, a clutch member having a hub pivotally mounted on the eccentric and a surface adapted to be engaged by the driving element, means tending to turn the clutch member on the eccentric in the direction to separate the clutch member from the driving element against the action of centrifugal force, an arm rigid with said shaft, and a shifting collar mounted upon and slidable longitudinally of said sleeve and arranged to swing said arm in either direction and thus turn said eccentric to place the clutch member in or out of engagement with said surface.

3. A clutch having, in combination, a driving element and a driven element, said driven element comprising a spider having a supporting sleeve, said spider also having a pair of lugs having alined bearing openings, a shaft having two concentric portions journaled in said bearing openings and an intermediate eccentric, a clutch member having a hub pivotally mounted on the eccentric and a surface adapted to be engaged by the driving element, a spring exerting a tendency to turn the clutch member on the eccentric in the direction to separate the clutch member from the driving element against the action of centrifugal force, an arm rigid with said shaft, a shifting collar mounted upon and slidable longitudinally of said sleeve, and an adjustable connection between the collar and said arm.

4. A clutch having, in combination, a driving element and a driven element, said driven element comprising a spider having a supporting sleeve, said spider also having a pair of lugs having alined bearing openings, a shaft having two concentric portions journaled in said bearing openings and an intermediate eccentric, a clutch member having a hub pivotally mounted on the eccentric and a surface adapted to be engaged by the driving element, said clutch member also having a stop adapted to engage the spider, a spring exerting a tendency to turn the clutch member on the eccentric in the direction to place the stop in contact with the spider, an arm rigid with said shaft, a shifting collar mounted upon and slidable longitudinally of said sleeve, an adjustable member on the collar, a link pivotally connected to said member and said arm, and means to limit movement of said collar in one direction when said link is on dead center.

5. A clutch having, in combination, a driving element and a driven element, an eccentric journaled in one of said elements, a clutch member having a hub pivotally mounted on the eccentric and a surface adapted to be engaged by the other element, means tending to turn the clutch member on the eccentric in the direction to separate the clutch member from said other element against the action of centrifugal force, an arm rigid with said eccentric, and a slidable collar arranged to move said arm.

6. A clutch comprising, in combination, a driving element having a clutch surface thereon, a driven shaft, a clutch member pivotally mounted on a support stationary with respect to said shaft to turn with the latter and having a clutch surface adapted to engage the first mentioned clutch surface, an eccentric for moving said member back and forth into and out of operative engagement, an arm for turning said eccentric, a manually operable means for moving said arm to effect the operation of said eccentric, means tending normally to swing said member on its pivot out of engagement, and a stop for limiting the extent of movement of said member.

7. A clutch comprising, in combination, a drive element having a driving clutch surface, a driven shaft, a clutch member pivotally mounted on a support stationary with respect to said shaft and having a clutch surface for engagement with said driving clutch surface, an eccentric for moving said element into and out of driving engagement, an arm for turning said eccentric, a manually operable means for effecting the movement of said arm to operate said eccentric, an adjustment between said last mentioned means and said arm to change the relation of said clutch member to said pulley, means tending normally to swing said clutch member on its pivot out of engagement, and an adjustable stop for limiting the movement of said member.

8. A clutch having, in combination, a driving element, a driven element, an eccentric mounted to turn on one of said elements, a clutch member mounted for pivotal movement on said eccentric and having a clutch surface adapted for engagement with the other of said elements arranged to have driving engagement when said eccentric is turned to a certain position, means for moving said eccentric into and out of position permitting driving engagement of said clutch member, means tending to turn said clutch member on the eccentric in a direction to separate the same from driving engagement, and means operable under centrifugal force in the operation of the driven element to assist said last mentioned means in effecting such separation.

In testimony whereof, I have hereunto set my hand.

ALBERT MASTER.